United States Patent
Beck

(10) Patent No.: US 11,956,481 B2
(45) Date of Patent: *Apr. 9, 2024

(54) PROTOCOL AND ARCHITECTURE FOR THE DECENTRALIZATION OF CONTENT DELIVERY

(71) Applicant: CHARTER COMMUNICATIONS OPERATING, LLC, St. Louis, MO (US)

(72) Inventor: Jody Lee Beck, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,787

(22) Filed: Mar. 27, 2023

(65) Prior Publication Data

US 2023/0239519 A1 Jul. 27, 2023

Related U.S. Application Data

(63) Continuation of application No. 17/245,051, filed on Apr. 30, 2021, now Pat. No. 11,653,035, which is a continuation of application No. 16/699,970, filed on Dec. 2, 2019, now Pat. No. 11,032,581, which is a continuation of application No. 15/903,760, filed on Feb. 23, 2018, now Pat. No. 10,531,130.

(Continued)

(51) Int. Cl.
*H04N 21/2183* (2011.01)
*H04L 9/08* (2006.01)
(Continued)

(52) U.S. Cl.
CPC ....... *H04N 21/2183* (2013.01); *H04L 9/0822* (2013.01); *H04L 65/612* (2022.05); *H04L 67/568* (2022.05); *H04L 67/02* (2013.01)

(58) Field of Classification Search
CPC ............ H04N 21/2183; H04N 21/222; H04N 21/23106; H04N 21/6125;
(Continued)

(56) References Cited

U.S. PATENT DOCUMENTS 7,376,716 B2  5/2008  Dilley et al.
9,172,532 B1  10/2015  Fuller et al.
(Continued)

FOREIGN PATENT DOCUMENTS

EP        2741517 A1    6/2014
WO   2010/140935 A1   12/2010

OTHER PUBLICATIONS

Srinivasan, "Improving Content Delivery and Service Discovery in Networks" (2016).
(Continued)

*Primary Examiner* — Alina A Boutah
(74) *Attorney, Agent, or Firm* — THE MARBURY LAW GROUP, PLLC

(57) ABSTRACT

Systems, methods, and devices of the various embodiments disclosed herein may provide a protocol and architecture for decentralization of content delivery. Various embodiments may provide a client based method for content delivery from content delivery networks (CDNs) via tiered caches of content hosted by Internet Service Providers (ISPs). In various embodiments, content delivery protocol (CDP) messages may enable clients to discover local cache network topologies and request content from a CDN based on a discovered local cache network topology. In various embodiments, security may be provided for the content delivery by the use of key encryption and/or file hashing.

24 Claims, 10 Drawing Sheets

Related U.S. Application Data

(60) Provisional application No. 62/620,676, filed on Jan. 23, 2018.

(51) Int. Cl.
*H04L 65/612* (2022.01)
*H04L 67/02* (2022.01)
*H04L 67/568* (2022.01)

(58) Field of Classification Search
CPC ............ H04N 21/64322; H04N 21/658; H04L 9/0822; H04L 9/3247; H04L 65/612; H04L 65/80; H04L 67/568; H04L 67/02; H04L 2209/60
See application file for complete search history.

(56) References Cited

U.S. PATENT DOCUMENTS

| | | |
|---|---|---|
| 2010/0217869 A1 | 8/2010 | Esteban et al. |
| 2011/0078230 A1 | 3/2011 | Sepulveda |
| 2012/0185557 A1 | 7/2012 | Dimarco et al. |
| 2012/0281621 A1 | 11/2012 | Lotfallah et al. |
| 2013/0094445 A1 | 4/2013 | De Foy et al. |
| 2015/0026289 A1* | 1/2015 | Nordness ............ H04L 67/1097 709/213 |
| 2015/0026352 A1 | 1/2015 | De Foy et al. |
| 2016/0191673 A1 | 6/2016 | Bohannon et al. |
| 2016/0226992 A1 | 8/2016 | Akcin |
| 2016/0294971 A1 | 10/2016 | Li et al. |
| 2016/0315857 A1 | 10/2016 | Lubashev et al. |
| 2017/0366637 A1 | 12/2017 | Bandyopadhyay et al. |
| 2018/0063598 A1 | 3/2018 | Kwak et al. |
| 2018/0248969 A1 | 8/2018 | Zhu et al. |

OTHER PUBLICATIONS

"BGP tutorial: The routing protocol that makes the Internet work", (2019).

Kayiama, et al., "Analyzing influence of network topology on designing ISP-operated CDN", (2011).

* cited by examiner

PROTOCOL AND ARCHITECTURE FOR THE DECENTRALIZATION OF CONTENT DELIVERY

RELATED APPLICATIONS

This application is a continuation of, and claims the benefit of priority to, U.S. Non-Provisional patent application Ser. No. 17/245,051 entitled "Protocol And Architecture For The Decentralization Of Content Delivery," filed Apr. 30, 2021 which is a continuation of, and claims the benefit of priority to, U.S. Non-Provisional patent application Ser. No. 16/699,970 entitled "Protocol And Architecture For The Decentralization Of Content Delivery," filed Dec. 2, 2019, now U.S. Pat. No. 11,032,581, which is a continuation of, and claims the benefit of priority to, U.S. Non-Provisional patent application Ser. No. 15/903,760, now U.S. Pat. No. 10,531,130, entitled "Protocol And Architecture For The Decentralization Of Content Delivery," filed Feb. 23, 2018, which claims the benefit of priority to U.S. Provisional Patent Application No. 62/620,676 entitled "Protocol And Architecture For The Decentralization Of Content Delivery," filed Jan. 23, 2018, the entire contents of all three of which are hereby incorporated by reference for all purposes.

BACKGROUND

Conventional content delivery models represent a top-down centralized approach to content delivery, especially over-the-top (OTT) content delivery (e.g., OTT video delivery). Typically, a content delivery network includes an origin server hosting a content item. In conventional content delivery models, users access the origin server via connections between the user's respective computing devices and the origin server established using an internet service provider (ISP) network. In conventional content delivery models, supporting this access to the origin server places high demands on the ISP networks and the cost of delivering the content increases as more layers of the ISP network are used to access the content in conventional content delivery models. Some conventional content delivery models reduce some of the demand and costs of delivery content by using limited geographically distributed cache servers hosting copies of a content item, but the ISP networks gain only limited benefits in such conventional content delivery models as the ISP networks are typically still hauling bits of the content item through most layers of the ISP network.

SUMMARY

The systems, methods, and devices of the various embodiments disclosed herein may provide a protocol and architecture for decentralization of content delivery. Various embodiments may provide a client based method for content delivery from content delivery networks (CDNs) via tiered caches of content hosted by Internet Service Providers (ISPs). In various embodiments, content delivery protocol (CDP) messages may enable clients to discover local cache network topologies and request content from a CDN based on a discovered local cache network topology. In various embodiments, security may be provided for the content delivery by the use of key encryption and/or file hashing.

Various embodiments may provide a method for content delivery from a CDN, including sending a discovery message to an Internet Service Provider (ISP) network, receiving a capability response from a local cache server in response to the discovery message, wherein the capability response indicates topology data for the local cache server, and sending a request for content to the CDN including the topology data for the local cache server. Various embodiments may further include receiving a response from the CDN including an address for the content at the local cache server in response to sending the request for the content to the CDN, and sending a request for the content to the address for the content at the local cache server. Various embodiments may further include receiving the content from the local cache server in response to the request for the content to the address for the content at the local cache server, and sending a report to the CDN in response to receiving the content from the local cache server. In various embodiments, the discovery message may be a content delivery protocol (CDP) discovery message, the capability response may be a CDP capability response, the request for content to the CDN may be a CDP GET message, and/or the request for the content to the address for the content at the local cache server is an Hypertext Transfer Protocol (HTTP) GET message. In various embodiments, the topology data for the local cache server may indicate tier cache server addresses in the ISP network. In various embodiments, the topology data may be signed by a key of the CDN. In various embodiments, the response from the address for the content at the local cache server may include a file name for the content that is a hash sum of the content. In various embodiments, the topology data may indicate three different tier cache server addresses and the three different tier cache server address may be at different levels of the ISP network.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above. Further embodiments disclosed herein include a server configured with processor executable instructions to perform operations of the methods summarized above. Further embodiments disclosed herein include a server including means for performing functions of the methods summarized above. Further embodiments disclosed herein include a non-transitory processor-readable storage medium having stored thereon processor-executable instructions configured to cause a server processor to perform operations o of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "computing device" and "node" are used interchangeably herein to refer to any one or all of satellite or cable set top boxes, laptop computers, rack mounted computers, routers, cellular telephones, smart phones, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

Figure 1:
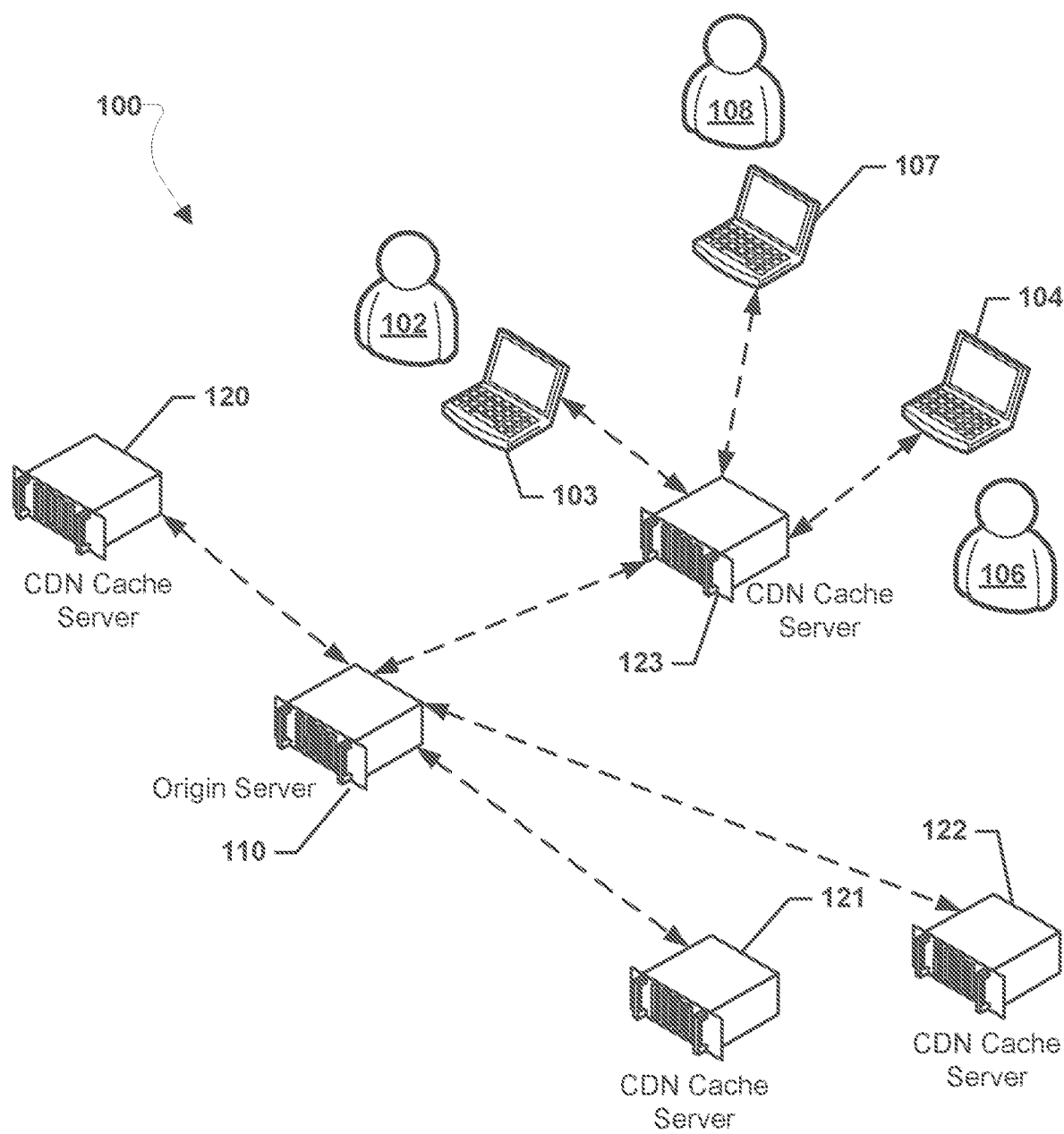
FIG. 1 is a system block diagram of a content delivery network (CDN) according to a conventional content delivery model.

FIG. 1 is a system block diagram of a content delivery network (CDN) 100 according to a conventional content delivery model. The CDN 100 may include an origin server 110 and CDN cache servers 120, 121, 122, and 123. The origin server 110 may be connected to the CDN cache servers 120, 121, 122, and 123, such as by a wired and/or wireless network, such as the Internet, and via those connections the origin server 110 and CDN cache servers 120, 121, 122, and 123 may exchange data with one another. The origin server 110 may be located in one geographic region, such as in the continental United States, etc., and the CDN cache servers 120, 121, 122, and 123 may be located within sub-regions within that geographic region, such as major metropolitan areas (e.g., New York, Los Angeles, etc.). The origin server 110 and/or CDN cache servers 120, 121, 122, and 123 may interconnect with one or more Internet Service Provider (ISP) networks and may exchange data with the various devices of the ISP networks and/or client computing devices via the ISP networks. The origin server 110 and/or CDN cache servers 120, 121, 122, and 123 may store copies of content, such as files (e.g., movies, audio clips, documents, etc.) or any other type data. The origin server 110 and/or CDN cache servers 120, 121, 122, and 123 may serve content to requesting computing devices. The requesting computing devices may send requests for the content to the origin server 110 and/or CDN cache servers 120, 121, 122, and 123 via the respective ISP networks interconnected to the CDN 100. For example, client computing devices 103, 107, and 104 may request content from CDN cache server 123 via the ISP networks associated with client computing devices 103, 107, and 104 and CDN cache server 123 may serve the requested content to the client computing devices 103, 107, and 104 by sending the content to the client computing devices 103, 107, and 104 through their respective ISP networks. In this manner, users 102, 108, and 106 may consume the content (e.g., playout a video, view a document, listen to streamed audio, etc.) from the CDN 100 at their respective client computing devices 103, 107, and 104.

Figure 2:
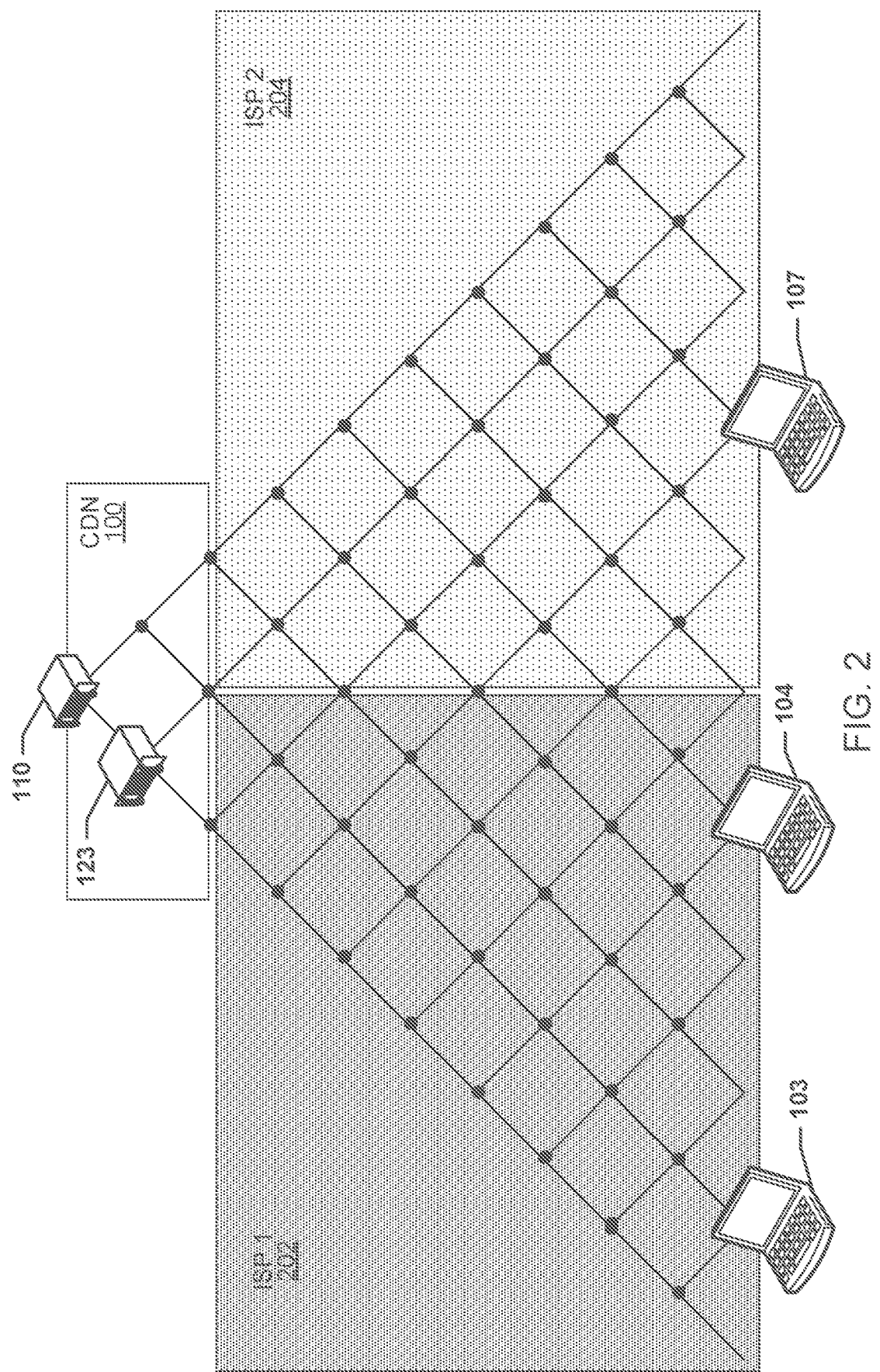
FIG. 2 is a system block diagram illustrating interconnections between a CDN, Internet Service Provider (ISP) networks, and client computing devices according to a conventional content delivery model.

FIG. 2 is a system block diagram illustrating interconnections between the CDN 100, ISP networks ISP1 202 and ISP2 204, and client computing devices 103, 107, and 104 according to a conventional content delivery model. With reference to FIGS. 1 and 2, ISP1 202 and ISP2 204 may include various network pathways that represent hardware and/or software connections between client computing devices on the ISP networks and the ISP networks themselves. For example, client computing devices 103 and 104 may connect to ISP network ISP1 202 and client computing device 107 may connect to ISP network ISP2 204. The ISP networks ISP1 202 and ISP2 204 may be arranged in tiered layers, such as core layers, distribution layers, and access layers. Access layers may be the layers to which client computing devices connect and distribution layers may connect access layers to core layers. The cost associated with transporting content may grow as content is moved across more layers of the network. For example, the cost of carrying content at the core layer may be lower than the cost of carrying content from the core layer, through the distribution layers, and across the access layers to the client computing devices.

The ISP networks ISP1 202 and ISP2 204 may interconnect to the CDN 100. The interconnects between the CDN 100 and the ISP networks ISP1 202 and ISP2 204 may be physical connections via which data (e.g., messages, content, etc.) may be exchanged between devices of the CDN 100 (e.g., origin server 110, CDN cache server 123, etc.) and the devices of, or connected to, the ISP networks ISP1 202 and ISP2 204 (e.g., respective client computing devices 103, 107, and 104, etc.).

While the CDN 100 may decentralize content among the origin server 110 and CDN cache servers, such as CDN cache server 123, the interconnects to the ISP networks ISP1 202 and ISP2 204 may result in minimal (e.g., only one, two, three, etc.) actual physical connections between the CDN 100 and the ISP networks ISP1 202 and ISP2 204 being available for the ISP networks ISP1 202 and ISP2 204 to use to transport content from the CDN 100 to the client computing devices 103, 107, and 104. As the content from the CDN 100 is coming from the same minimal (e.g., only one, two, three, etc.) actual physical connections between the CDN 100 and the ISP networks ISP1 202 and ISP2 204, the transport of that content to the client computing devices 103, 107, and 104 incurs the full cost of transporting content across the ISP networks ISP1 202 and ISP2 204. In conventional content delivery models, supporting this access to the CDN 100 places high demands on the ISP networks ISP1 202 and ISP2 204 and the cost of delivering the content increases as more layers of the ISP networks ISP1 202 and ISP2 204 are used to access the content in conventional content delivery models. Some conventional content delivery models reduce some of the demand and costs of delivery content by using limited geographically distributed cache servers hosting copies of a content item (e.g., CDN cache server 123, etc.). While this may reduce some cost to the CDN 100, the ISP networks ISP1 202 and ISP2 204 gain only limited benefits in such conventional content delivery models as the ISP networks ISP1 202 and ISP2 204 are typically still hauling bits of the content item through most layers of the ISP networks ISP1 202 and ISP2 204.

Various embodiments may provide a protocol and architecture for decentralization of content delivery that may reduce the demands and costs placed on ISPs when compared to conventional content delivery models. Various embodiments may provide a client based method for content delivery from CDNs via tiered caches of content hosted by ISPs. Various embodiments may provide a decentralization of content delivery while still enabling an upstream (or backend) control of content delivery. Various embodiments may enable high data transfer rates and/or low latency because content delivery may be decentralized to tiered caches at the ISP network edges.

In various embodiments, content delivery protocol (CDP) messages may enable client computing devices to discover local cache network topologies and request content from a CDN based on a discovered local cache network topology. In various embodiments, CDP messages may provide a secure transport protocol that uses Hypertext Transport Protocol (HTTP) as the underlying transport for content. In various embodiments, ISP networks may deploy tier cache servers at different layers of the ISP networks. The tier cache servers may be "white box" servers that may be configured to store copies of content provided by CDNs. For example, the tier cache servers may be Apache HTTP servers distributed at different layers in ISP networks. In various embodiments, groupings of tier cache servers in the ISP networks may be associated together as being at different levels in the ISP networks. The grouping of tier cache servers in the ISP network at different levels may be hierarchical. For example, tier cache servers closest to client computing device connections in the network may be referred to as tier 1 cache servers and, as tier cache servers are located deeper in the network layers away from the client computing device connections, the tier cache servers may be referred to as tier 2, tier 3, tier 4, tier 5, etc. cache servers. Tier levels in the network may be directly associated to network layers or tier levels may be associated with more than one network layer. ISP networks may include any number of tier levels, such as one level, two levels, three levels, four levels, five levels, etc. As an example, different tier levels may be associated with core layers, distribution layers, and access layers. Additionally, different tier levels may be associated with different level hubs and/or regional distribution centers in ISP networks.

Figure 3:
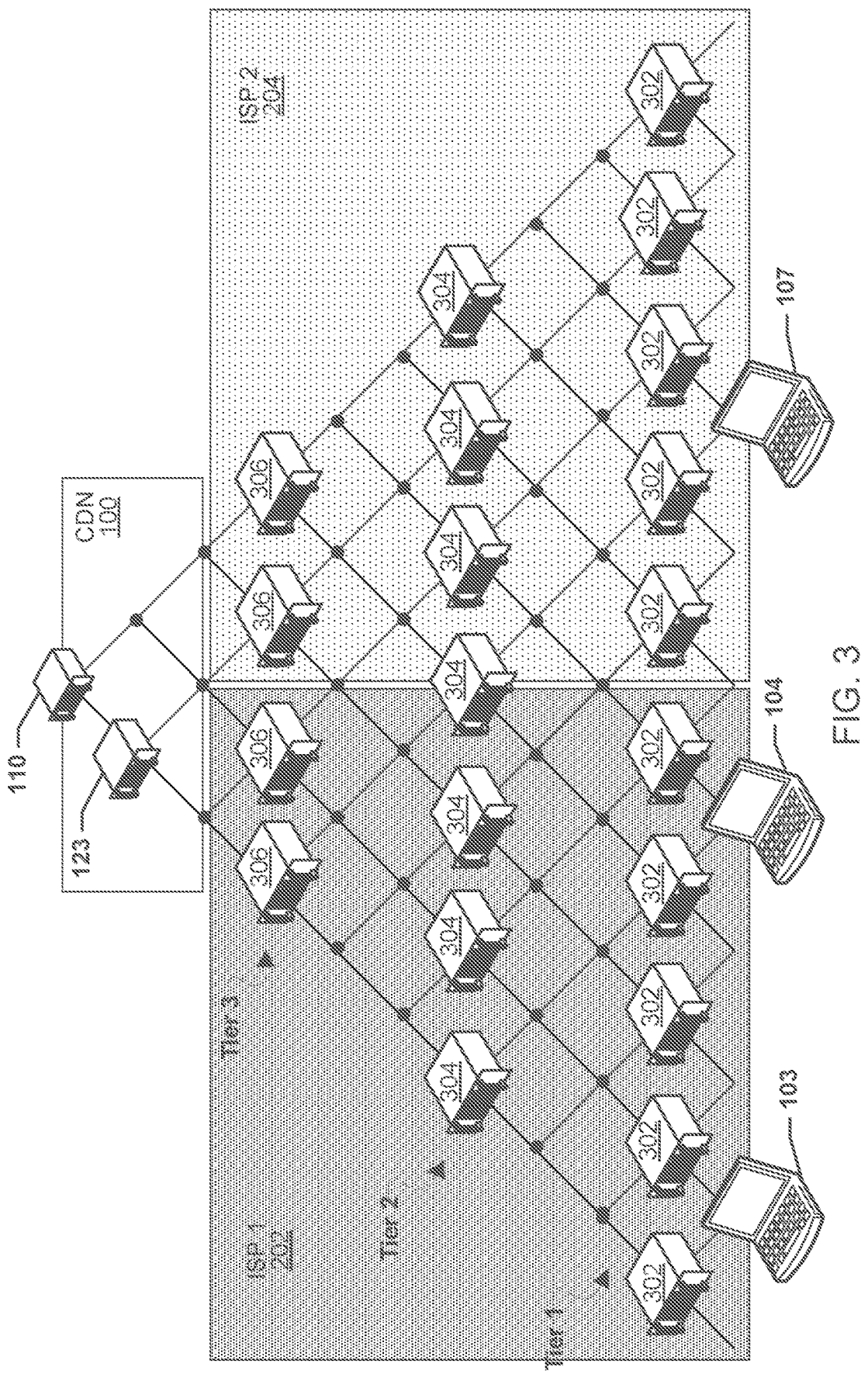
FIG. 3 is a system block diagram illustrating interconnections between a CDN, ISP networks, tier caches, and user computing devices according to various embodiments.

FIG. 3 illustrates interconnections between the CDN 100, ISP networks ISP1 202 and ISP2 204, tier cache servers 302, 304, and 306, and client computing devices 103, 104, and 107 according to various embodiments. With reference to FIGS. 1-3, the tier cache servers 302, 304, and 306 may be distributed throughout the ISP networks ISP1 202 and ISP2 204 in three tiers, Tier 1, Tier 2, and Tier 3. For example, Tier 1 may include one or more tier cache servers 302. The tier cache servers 302 may be located within the ISP networks ISP1 202 and ISP2 204 closest to the client computing devices 103, 104, and 107. Tier 2 may include one or more tier cache servers 304 and Tier 3 may include one or more tier cache servers 306. The Tier 3 tier cache servers 306 may be located closer to the interconnects to the CDN 100 in the ISP networks ISP1 202 and ISP2 204 than the Tier 2 tier cache servers 304 which may be located between the Tier 3 tier cache servers 306 and Tier 1 tier cache servers 302. In some embodiments, the number of Tier 1 tier cache servers 302 may be greater than the number of Tier 2 and/or Tier 3 tier cache servers 304 and/or 306. The tier cache servers 302, 304, and 306 may exchange data with one another via connections in the ISP networks ISP1 202 and ISP2 204 and may exchange messages according to various routing protocols, such as the Border Gateway Protocol (BGP), etc., with one another to establish their respective hierarchies in the ISP networks ISP1 202 and ISP2 204. In this manner, the tier cache servers 302, 304, and 306 may identify their respective topology data.

In various embodiments, the topology data may include one or more addresses, such as Internet Protocol (IP) Version (IPv) 4 (IPv4) and/or 6 (IPv6) addresses of the tier cache servers 302, 304, and 306 reachable in the ISP networks ISP1 202 and ISP2 204. Topology data may also include capability information for the tier cache servers 302, 304, and 306 reachable in the ISP networks ISP1 202 and ISP2 204, indications of the assigned tier level for the tier cache servers 302, 304, and 306 reachable in the ISP networks ISP1 202 and ISP2 204, redundant tier cache server addresses (e.g., same tier level tier cache server addresses providing a back-up support to a tier cache server 302, 304, or 306), and/or any other information related to the tier cache servers 302, 304, and 306 reachable in the ISP networks ISP1 202 and ISP2 204. Capability information may include supported version information, docker or virtual machine information, etc. For example, a tier cache server 302 in Tier 1 of ISP1 202 may identify the one or more tier cache servers 304 that are reachable in Tier 2 of ISP1 202. In a similar manner one of those reachable tier cache servers 304 in Tier 2 may have identified the one or more tier cache servers 306 that are reachable in Tier 3 of ISP1 202. The tier cache server 304 in Tier 2 of ISP1 202 may provide its topology information, such as one or more address, capability information, assigned tier level, redundant tier cache server address, etc., as well as may provide the topology information, such as one or more address, capability information, assigned tier level, redundant tier cache server address, etc., of the one or more tier cache servers 306 that are reachable in Tier 3 of ISP1 202 to tier cache server 302 in Tier 1 of ISP1 202. In this manner, the topology information for all tier levels may be distributed through the tier cache servers 302, 304, 306 of the different tier levels. Each tier cache server 302, 304, and 306 may use the topology information to indicate a path from that tier cache server 302, 304, and 306 up the various tiers 1, 2, and/or 3 in its respective ISP network ISP1 202 and/or ISP2 204.

In various embodiments, the tier cache servers 302, 304, and 306 may be discoverable via anycast messages. For example, a client computing device 103 connected to ISP1 202 may send an anycast message via its connections to the ISP1 202 to discover topology information from reachable Tier 1 tier cache servers 302. The discovery message may be a content delivery protocol (CDP) discovery message. A CDP discovery message may be an anycast discovery request indicating to a receiving network node (e.g., a tier cache server) to provide topology data in response to the CDP discovery message. In response to receiving a discovery request, such as a CDP discovery message, the receiving tier cache server 302, 304, or 306 may send a capability response indicating topology data, such as that tier cache server's 302, 304, or 306 topology data and the topology data of any upstream and/or redundant tier cache servers 302, 304, or 306. The capability response may be a CDP capability response indicating topology data, such as one or more address (e.g., IPv4, IPv6, etc.), capability information, assigned tier level, redundant tier cache server address, etc. Capability information may include supported version information, docker or virtual machine information, etc. Based on receiving the capability response from the tier cache server 302 of the ISP1 202, the client computing device 103 may determine the path from the client computing device 103 through the reachable tier cache servers 302, 304, and 306 of the various tiers 1, 2, and/or 3 in its respective ISP network ISP1 202. In various embodiments, the closest reachable tier cache server to the client computing device, such as tier cache server 302 to client computing device 103 may be referred to as a "local cache". As an example, a local cache may be a tier cache server at the network edge level, such as at Tier 1, from which client computing devices may receive CDP capability responses indicating topology data.

In various embodiments, security may be provided for the content delivery by the use of key encryption. In various embodiments, the topology data may be signed by a key of the CDN. For example, a public key of the CDN and/or a public key of the tier cache server 302 may be use by the tier cache server 302 providing the capability response to generate a signature element using the public key of the CDN and/or the public key of the tier cache server 302 itself. This encrypted signature element may be added to the capability response along with the topology data. The signature element may later be sent from a client computing device to the CDN 100 when requesting content. The CDN 100 may use the private key of the CDN and/or the private key of the tier cache server 302 to attempt to decrypt the signature element. A successful decryption of the CDN 100 may verify the topology data was received from an authorized tier cache server and an unsuccessful decryption may indicate the topology data was not received by an authorized tier cache server.

Various embodiments may enable content delivery from a CDN, such as CDN 100 to client computing devices, such as client computing devices 103, 104, 107 via tiered caches of content hosted by tier cache servers, such as tier cache servers 302, 304, 306, of ISP network, such as ISP networks ISP1 202 and ISP2 204. In various embodiments, the CDN 100 may distribute content to one or more tier levels, such as Tier 1, Tier 2, and/or Tier 3. In various embodiments, the content distributed to each tier level may be different. The content distribution may vary based on attributes of the content, such as popularity (or demand) for the content (e.g., the most popular content may be distributed through the most tier levels and the least popular content may be only available within the CDN 100 itself, etc.). The attributes of the content may be based on the content itself, such as size, type, etc., and/or may be based on the use of the content, such as demand (or popularity) as determined by usage reports (e.g., CDP reports, etc.) associated with the content.

Figure 4:
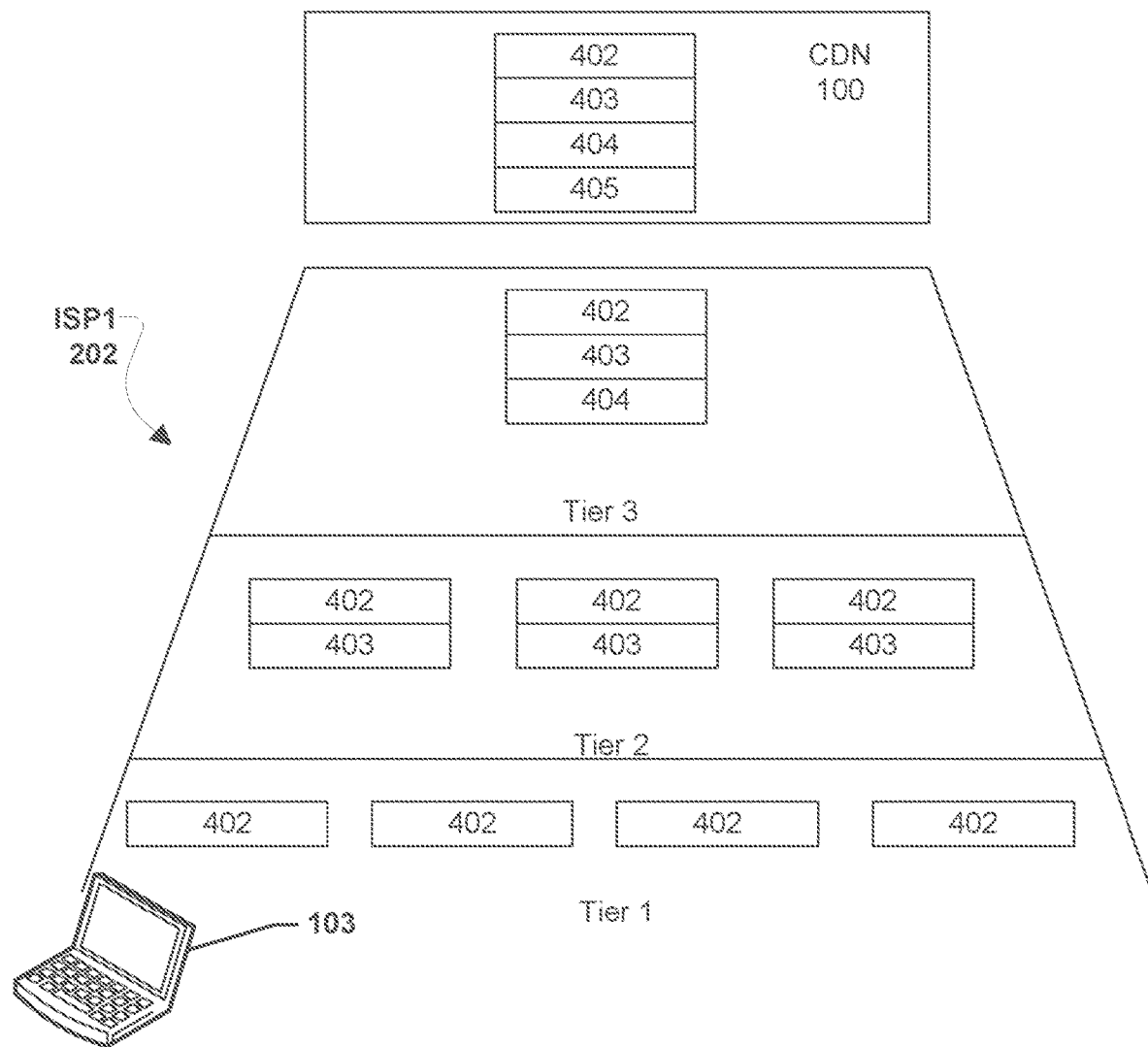
FIG. 4 is a block diagram illustrating content storage at tier caches according to various embodiments.

As an example, FIG. 4 illustrates content storage at tier levels within ISP1 202 according to various embodiments. With reference to FIGS. 1-4, the CDN 100 may have four items of content, such as files (e.g., movies, audio clips, documents, etc.) or any other type data, 402, 403, 404, and 405 that the CDN 100 is making available to client computing devices, such as client computing device 103. Content 402 may be a highly popular item of content (e.g., an episode of a hit television show, etc.), while content 403, 403, and 405 may be successively less popular items of content. The items of content 402, 403, 404, and 405 may be stored at the origin server 110 and optionally one or more CDN cache servers 120, 121, 122, and 123 of the CDN 100. The CDN 100 may determine the demand for the content 402, 403, 404, and 405, and based on the demand for the content 402, 403, 404, and 405 may store one or more of the content 402, 403, 404, and/or 405 at one or more of the tier cache servers 302, 304, and/or 306 at the various tier levels Tier 1, Tier 2, and/or Tier 3 in the ISP network ISP1 202. For example, the highest demand content 402 may be stored at tier cache servers 302, 304, and 306 of tier levels Tier 1, Tier 2, and Tier 3 in the ISP network ISP1 202. The next highest demand content 403 may be stored at tier cache servers 304 and 306 of tier levels Tier 2 and Tier 3 in the ISP network ISP1 202. The third highest demand content 404 be stored at tier cache servers 306 of tier level Tier 3 in the ISP network ISP1 202. The lowest demand content 405 may be stored in the servers of the CDN 100 and not in the ISP network ISP1 202. In this manner, the highest demand content 402 may be pushed closer to the ISP network ISP1 202 edge than the lower demand content 403, 404, and 405. As the highest demand content 402 is closer to the client computing device 103, the cost of providing the highest demand content 402 is lower than the cost would be if the highest demand content 402 were only available from the CDN 100. In various embodiments, the storage of the content 402, 403, and 404 in the tier cache servers of the ISP network ISP1 202 may be governed by storage and/or service agreements between the CDN 100 network operator and the ISP1 202 network operator. In various embodiments, the highest demand content 402 may be pushed to the local caches such that highest demand content 402 is available at tier cache servers at the network edge level.

In various embodiments, a client computing device, such as client computing device 103, may request an item of content from the CDN 100, such as content 402. The request for content from the client computing device may be a CDP message including the topology data for the local cache server. For example, the computing device 103 may send a CDP GET message indicating the address of the tier cache server 302, tier cache server 304, and tier cache server 306 respectively in tier levels, Tier 1, Tier 2, and Tier 3. The content may be selected by the computing device 103 based on browsing a website associated with the CDN 100, receiving a catalog file with content information, or in any other manner. For example, the user 102 of the client computing device 103 may browse a video webpage associated with the CDN 100 and select the video that is content 402 for output on the client computing device 103. The client computing device 103 may send a CDP GET message for the content 402 to the CDN 100 and the CDP GET message may include the topology data for the local cache server. In various embodiments, the CDP GET message may also include a signature element. The signature element may have been generated using the public key of the CDN 100 and/or the public key of the tier cache server 302 that provided the capability response to the client computing device 103. In some embodiments, the CDN 100 may use the private key of the CDN and/or the private key of the tier cache server 302 to attempt to decrypt the signature element. A successful decryption of the signature element may verify the topology data was received from an authorized tier cache server and an unsuccessful decryption may indicate the topology data was not received by an authorized tier cache server. Unsuccessful decryption may result in the CDN 100 rejecting or otherwise denying the request for content form the client computing device.

In various embodiments, in response to receiving the request for content from the client computing device, a device of the CDN 100, such as the origin server 110, CDN cache server 123, or another device of the CDN 100, may select the location from which the content may be served. As an example, content may be served from the CDN 100. Serving content from the CDN 100 may be of most benefit when the CDN 100 is the only location for the content. For example, content 405 may be served from the CDN 100 as it is not stored elsewhere. When content is to be served from the CDN 100, the CDN 100 may directly respond to the request with the content item requested. As another example, content may be served from the various tier levels of the ISP1 202 when the requested content is available at tier cache servers of the ISP1 202. The CDN 100 may track at which tier cache servers the content is stored in the ISP1 202 and may designate which tier cache servers are to be used for transport of content. As requests for content are received by the CDN 100, the CDN 100 may determine which one or more tier cache server for a requested item of content are set for transport. The CDN 100 may compare the topology data for the local cache server as indicated in the request (e.g., the CDP GET message) to the listing of tier cache servers set for transport. Based on the comparison, the CDN 100 may select the lowest tier level of the tier cache servers set for transport as the tier cache server to provide the content. The CDN 100 may send a response, such as a CDP response, to the client computing device requesting the content. The response may include the address for the content at the tier cache server to provide the content. The client computing device may request the content at the address from the tier cache server. For example, client computing device 103 may request content 402 from the CDN 100 in a CDP GET message including the topology data for the local cache server, e.g., tier cache server 302. The CDN 100 may determine content 402 is available at the local cache server (e.g., tier cache server 302) and may send a CDP response to the client computing device including the address, e.g., a Uniform Resource Locator (URL), of the content 402 at the local cache server (e.g., tier cache server 302). The client computing device 103 may send an HTTP GET message to the local cache server (e.g., tier cache server 302) requesting the content 402 and the local cache server (e.g., tier cache 302) may send the content 402 to the client computing device 103.

Delivering content 402 from the tier cache server 302 closest to the client computing device 103 (i.e., the tier cache server at the network edge of the ISP1 202) may enable high data transfer rates and/or low latency because content delivery may be decentralized to the ISP network edge. The high data transfer rates and/or low latency enabled by the various embodiments may enable various different applications for the decentralization of content delivery. For example, tier cache servers may operate as game servers to provide low latency game data to client computing devices. As other examples, web browsers, HTTP servers, and Over-the-top (OTT) services may benefit from the high data transfer rates and/or low latency enabled by the various embodiments. High data transfer services/applications, such as virtual reality, autonomous vehicle network communications, etc., may utilize the decentralization of content delivery enabled by the various embodiments to handle data transfer and provide high data transfer rates and/or low latency. Additionally, firewall applications, network functions virtualization applications, and other commercial applications may utilize the decentralization of content delivery enabled by the various embodiments to handle data transfer and provide high data transfer rates and/or low latency.

While the various examples discussed above reference content 402 being delivered from the tier cache server closest to the client computing device, the CDN 100 may select other tier cache servers from which to provide the content 402. For example, Tier 2 or Tier 3 cache server may be indicated in the CDP response. In this manner, the CDN 100 may control distribution of the content 402 and serve the content 402 from any tier cache server in which the content 402 is stored.

In various embodiments, security may be provided for the content delivery by the use of file hashing. In various embodiments, the response from the address for the content at the local cache server may include a file name for the content that is a hash sum of the content. The client computing device 103 may send an HTTP GET message to the local cache server (e.g., tier cache server 302) requesting the content 402. The HTTP GET message may use the file name that is the hash sum of that requested content (i.e., 402). In response to receiving the content 402, the client computing device 103 may generate a hash of the content 402. For example, the client may use the content 402 as an input to the same hash function used by the CDN 100 to generate the file name, and compare the hash sum output to the file name that is the hash sum provided in the CDP response. In response to the hash sums matching, the client computing device 103 may determine that the content 402 is the correct content and/or that the content has not been altered. In response to the hash sums not matching, the client computing device 103 may determine that the received content is not the correct content and/or that the content has been altered. In various embodiments, the client computing device 103 may not output or otherwise use content that is not the correct content and/or that the content has been altered.

In various embodiments, the client computing device may provide CDP reports to the CDN 100. The CDP reports may be sent from the client computing device 103, 104, 107 to the CDN 100 in response to attempts to download content, during the downloading of content, and/or upon completion of the download of the content. The CDP reports may report on various attributes of the download of the content, such as transfer rate, error rate, latency, speed, data volume, throughput, bitrate, etc. As one example, the client computing device 103, 104, 107 may send a CDP progress report to the CDN 100 indicating whether the request of the content from the local cache server (e.g., tier cache server 302) was successful or not. As another example, the client computing device may send a CDP progress report to the CDN 100 indicating attributes of the download of the content, such as transfer rate, error rate, latency, speed, data volume, throughput, bitrate, etc., from the local cache server (e.g., tier cache server 302). As a further example, when the download is complete, the client computing device 103, 104, 107 may send a CDP completion report to the CDN 100 indicating attributes of the download of the content, such as transfer rate, error rate, latency, speed, data volume, throughput, bitrate, etc., from the local cache server (e.g., tier cache server 302). Additionally, the CDP completion report may indicate whether or not the check of the hash sum of the file name of the content was successful. One or more of the various CDP reports may be sent for each download/download attempt. For example, multiple CDP progress reports and a CDP completion report may be sent for each download/download attempt. The CDN 100 may use the CDP reports to monitor the performance of the tier cache servers being used to serve content. As the CDN 100 may not directly control the tier cache servers, the CDN 100 may not receive telemetry or other performance data from the tier cache servers. The CDP reports may thus serve to give visibility of the provisioning performance of the tier cache servers to the CDN 100. The CDP reports and the resulting provisioning performance data may be used by the CDN 100 to control the provisioning of content from the tier cache servers. For example, based on the CDP reports content may be moved up or down the tiers of the network and/or tier cache servers may be brought on or off line at different network tiers.

Figure 5A:
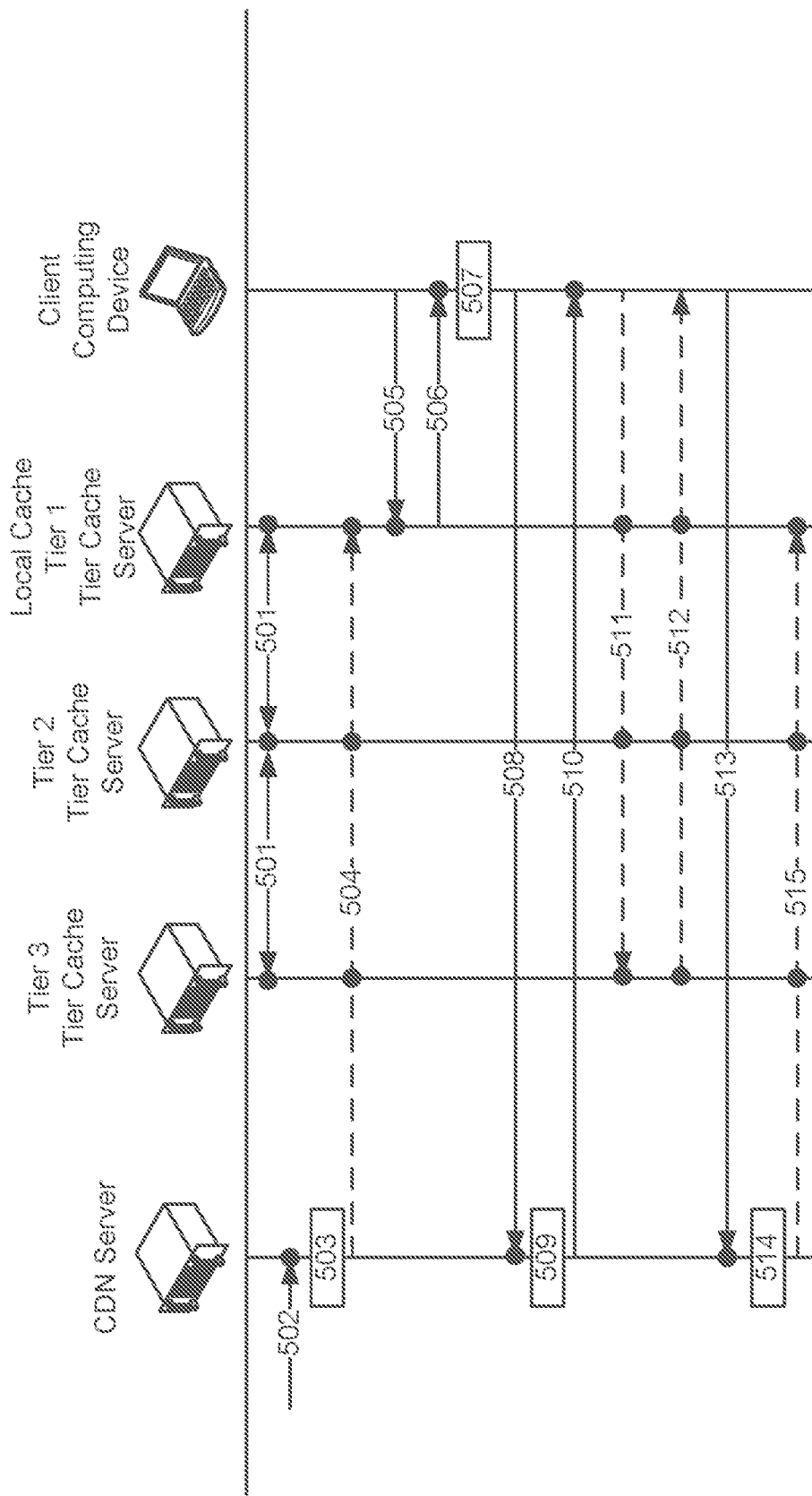
FIG. 5A is a call flow diagram illustrating an embodiment method for content delivery.

FIG. 5A is a call flow diagram illustrating an embodiment method for content delivery. In various embodiments, the operations and interactions illustrated in FIG. 5A may be performed by a processor of a CDN server, such as servers 110, 120, 121, 122, and 123, processors of tier cache servers, such as tier cache servers 302, 304, and 306, and a processor of a computing device, such as computing device 103, 104, and 107.

With reference to FIGS. 1-5A, in operations 501 a local cache Tier 1 tier cache server, such as a tier cache server 302, a Tier 2 tier cache server, such as a tier cache server 304, and a Tier 3 tier cache server, such as a tier cache server 306, may exchange data and/or messages with one another via various routing protocols, such as the Border Gateway Protocol (BGP), etc., to establish their respective hierarchies in an ISP network, such as ISP networks ISP1 202 and ISP2 204. The Tier 1 tier cache server 302, Tier 2 tier cache server 304, and Tier 3 tier cache server 306 may store their respective hierarchies in the ISP network as topology data. In various embodiments, the topology data may include one or more addresses, such as Internet Protocol (IP) Version (IPv) 4 (IPv4) and/or 6 (IPv6) addresses of the Tier 1 tier cache server 302, Tier 2 tier cache server 304, and Tier 3 tier cache server 306 reachable in the ISP network. Topology data may also include capability information for the Tier 1 tier cache server 302, Tier 2 tier cache server 304, and Tier 3 tier cache server 306, indications of the assigned tier level for the Tier 1 tier cache server 302, Tier 2 tier cache server 304, and Tier 3 tier cache server 306, redundant tier cache server addresses (e.g., same tier level tier cache server addresses providing a back-up support to a tier cache server), and/or any other information related to the Tier 1 tier cache server 302, Tier 2 tier cache server 304, and Tier 3 tier cache server 306. For example, the capability information may include supported version information, docker or virtual machine information, etc. for one or more of the Tier 1 tier cache server 302, Tier 2 tier cache server 304, and Tier 3 tier cache server 306.

In operation 502, the CDN server, such as origin server 110, may receive an item of content, such as a media file, for provisioning to client computing devices. In operation 503, the CDN server may determine one or more tier level at which to store the item of content. For example, the CDN server may determine whether to store the item of content at one or more of the Tier 1 tier cache server 302, Tier 2 tier cache server 304, and Tier 3 tier cache server 306. The content distribution may vary based on attributes of the content, such as popularity (or demand) for the content (e.g., the most popular content may be distributed through the most tier levels and the least popular content may be only available within the CDN 100 itself, etc.). In operation 504, the CDN server may send a copy of the item of content to one or more of the Tier 1 tier cache server 302, Tier 2 tier cache server 304, and Tier 3 tier cache server 306. In various embodiments, the CDN server may assign a name to the copy of the item of content at the one or more of the Tier 1 tier cache server 302, Tier 2 tier cache server 304, and Tier 3 tier cache server 306 that is a hash sum of the item of content. Optionally, the CDN server may also send a public key to the one or more of the Tier 1 tier cache server 302, Tier 2 tier cache server 304, and Tier 3 tier cache server 306. The public key may be used by the Tier 1 tier cache server 302, Tier 2 tier cache server 304, and Tier 3 tier cache server 306 to generate signature elements. The CDN server may set one or more of the Tier 1 tier cache server 302, Tier 2 tier cache server 304, and Tier 3 tier cache server 306 as the servers for transport of the content. In this manner, the CDN server may track both the tier cache servers that receive copies of the items of content and which of those tier cache servers should be used for provisioning of the content to any requesting client computing devices.

In operation 505, the client computing device, such as client computing device 103, may send an anycast message to the ISP network to discover tier cache servers and the topology information for those tier cache servers. For example, the anycast message may a CDP discovery message. A CDP discovery message may be an anycast discovery request indicating to a receiving network node (e.g., a tier cache server) to provide topology data in response to the CDP discovery message. In some embodiments, network edge tier cache servers, such as Tier 1 tier cache servers 302, also referred to as local cache servers, may be configured to listen for and respond to CDP discovery messages, while tier cache servers associated with higher tiers may not be configured to listed for and respond to CDP discovery messages.

In response to receiving a discovery request, the Tier 1 tier cache server 302 may send a capability response indicating topology data, such as its respective topology data and the topology data of any upstream and/or redundant tier cache servers, in operation 506. The capability response may be a CDP capability response indicating topology data, such as one or more address (e.g., IPv4, IPv6, etc.), capability information, assigned tier level, redundant tier cache server address, etc. Based on receiving the capability response from the Tier 1 tier cache server 302, the client computing device may determine the path from the client computing device through the reachable tier cache servers of the various tiers in its respective ISP network.

In operation 507, the client computing device may select a content item for downloading. The client computing device may select an item of content by browsing a website, receiving a catalog file with content information, or in any other manner For example, the content item may be the same content item received by the CDN server in operation 502. The client computing device may select content items for downloading in any manner As one example, the client computing device may browse a web page hosted by the CDN server (or another server associated with the CDN)

listing content available for downloading. In various embodiments, the web page data, such as field elements of the web page, may indicate whether or not the CDN server supports CDP requests.

In various embodiments, when the CDN server does not support CDP requests, the client computing device may request selected content via HTTP requests from the CDN server. In various embodiments, when the CDN server supports CDP requests, the client computing device may generate a request for an item of content, such as the item of content received by the CDN server in operation 502. In operation 508 the client computing device may send a request for an item of content to the CDN server. The request for content from the client computing device may be a CDP message including the topology data for the local cache server. For example, the computing device may send a CDP GET message indicating the address of the Tier 1 tier cache server 302, Tier 2 tier cache server 304, and Tier 3 tier cache server 306. In various embodiments, the CDP GET message may also include a signature element. The signature element may have been generated using the public key of the CDN server. An example CDP GET message schema may be as follows:
  GET controller.example.com/video.file CDP/7.9
  T2-Cache-IPv4: 10.10.10.25 10.10.10.26
  T2-Cache-IPv6: 2001:db8::10:25/128
  T3-Cache-IPv4: 10.11.11.25 10.11.11.26
  IPv4-fed-Multicast: 10.10.10.25
  Docker-Prefix: 2001:db8:0:111:111/64
  Token="PKI-SIGNED[<clientIP>:7843:<date>:broadband]"

The CDN server may receive the request, such as the CDP GET message, and in operation 509 the CDN server may determine from which to provision the requested item of content. For example, the requested item of content may be available at the CDN server itself, the Tier 1 tier cache server 302, Tier 2 tier cache server 304, and/or Tier 3 tier cache server 306. In some embodiments, the CDN server may use the private key of the CDN to attempt to decrypt the signature element. A successful decryption of the signature element may verify the topology data was received from an authorized tier cache server and an unsuccessful decryption may indicate the topology data was not received by an authorized tier cache server. Unsuccessful decryption may result in the CDN server rejecting or otherwise denying the request for content form the client computing device. The CDN server may select the location from which to provision the content in various manners. For example, when the content is only available at the CDN server, the CDN server may respond to the request by serving the requested item of content in response to the request. As another example, when the content is stored at the CDN server and one or more of the Tier 1 tier cache server 302, Tier 2 tier cache server 304, and Tier 3 tier cache server 306, the CDN server may select the tier cache server closest to the client computing device to serve the content. For example, the CDN server may compare the topology data for the local cache server as indicated in the request (e.g., the CDP GET message) to the listing of tier cache servers set for transport stored at the CDN server. Based on the comparison, the CDN server may select the lowest tier level one of the tier cache servers set for transport, such as Tier 1 tier cache server 302, as the tier cache server to provide the content.

In operation 510, the CDN server may send a response to the client computing device including the address for the content at the tier cache server selected to provide the item of content. For example, the response may be a CDP response including a URL of the content at the Tier 1 tier cache server 302, Tier 2 tier cache server 304, or Tier 3 tier cache server 306. The URL may include the file name of the content as it is stored at that tier cache server, and the file name may be a hash sum of the item of content. For example, a CDP response may include a URL for a file name that is a hash sum of an item of content stored at the Tier 1 tier cache server 302.

In operation 511, the client computing device may send an HTTP GET message to the address for the content at the tier cache server selected to provide the item of content. For example, the client computing device may send an HTTP GET message to the URL listed in the CDP response. The tier cache server selected to provide the item of content may be one of the Tier 1 tier cache server 302, Tier 2 tier cache server 304, or Tier 3 tier cache server 306. For example, the client computing device may send an HTTP GET message to the Tier 1 tier cache server 302, which may be the local cache server for the client computing device as it is the tier cache server closest to the network edge. Delivering content from the tier cache server closest to the client computing device may enable high data transfer rates and/or low latency because content delivery may be decentralized to the ISP network edge. In operation 512, the tier cache server selected to provide the item of content may be one of the Tier 1 tier cache server 302, Tier 2 tier cache server 304, or Tier 3 tier cache server 306 may deliver the content to the client computing device. In response to receiving the content, the client computing device may generate a hash of the content. For example, the client may use the content as an input to the same hash function used by the CDN server to generate the file name, and compare the hash sum output to the file name that is the hash sum provided in the CDP response. In response to the hash sums matching, the client computing device may determine that the content is the correct content and/or that the content has not been altered. In response to the hash sums not matching, the client computing device may determine that the received content is not the correct content and/or that the content has been altered. In various embodiments, the client computing device may not output or otherwise use content that is not the correct content and/or that the content has been altered.

In various embodiments, the client computing device may provide CDP reports to the CDN server in operation 513. The CDP reports may be sent from the client computing device to the CDN server in response to attempting download of the content, during the downloading of content, and/or upon completion of the download of the content. The CDP reports may report on various attributes of the download of the content, such as transfer rate, error rate, latency, speed, data volume, throughput, bitrate, etc. As one example, the client computing device may send a CDP progress report to the CDN server indicating whether the request of the content from the local cache server was successful or not. For example, a cache miss at a tier cache server may result in a CDP progress report indicating the cache miss being sent to the CDN server. As another example, the client computing device may send a CDP progress report to the CDN server indicating attributes of the download of the content, such as transfer rate, error rate, latency, speed, data volume, throughput, bitrate, etc., from the local cache server. As a further example, when the download is complete, the client computing device may send a CDP completion report to the CDN server indicating attributes of the download of the content, such as transfer rate, error rate, latency, speed, data volume, throughput, bitrate, etc., from the local cache server. Additionally, the CDP completion report may indicate whether or not the check of the hash sum of the file name of the content was successful. One or more of the various CDP reports may be sent for each download. For example, multiple CDP progress reports and a CDP completion report may be sent for each download.

In operation 514, the CDN server may use the CDP reports to monitor the performance of the tier cache servers being used to serve content. As the CDN server may not directly control the tier cache servers, the CDN server may not receive telemetry or other performance data from the tier cache servers. The CDP reports may thus serve to give visibility of the provisioning performance of the tier cache servers to the CDN server. The CDP reports and the resulting provisioning performance data may be used by the CDN server to control the provisioning of content from the tier cache servers. For example, based on the CDP reports content may be moved up or down the tiers of the network in operation 515.

Figure 5B:
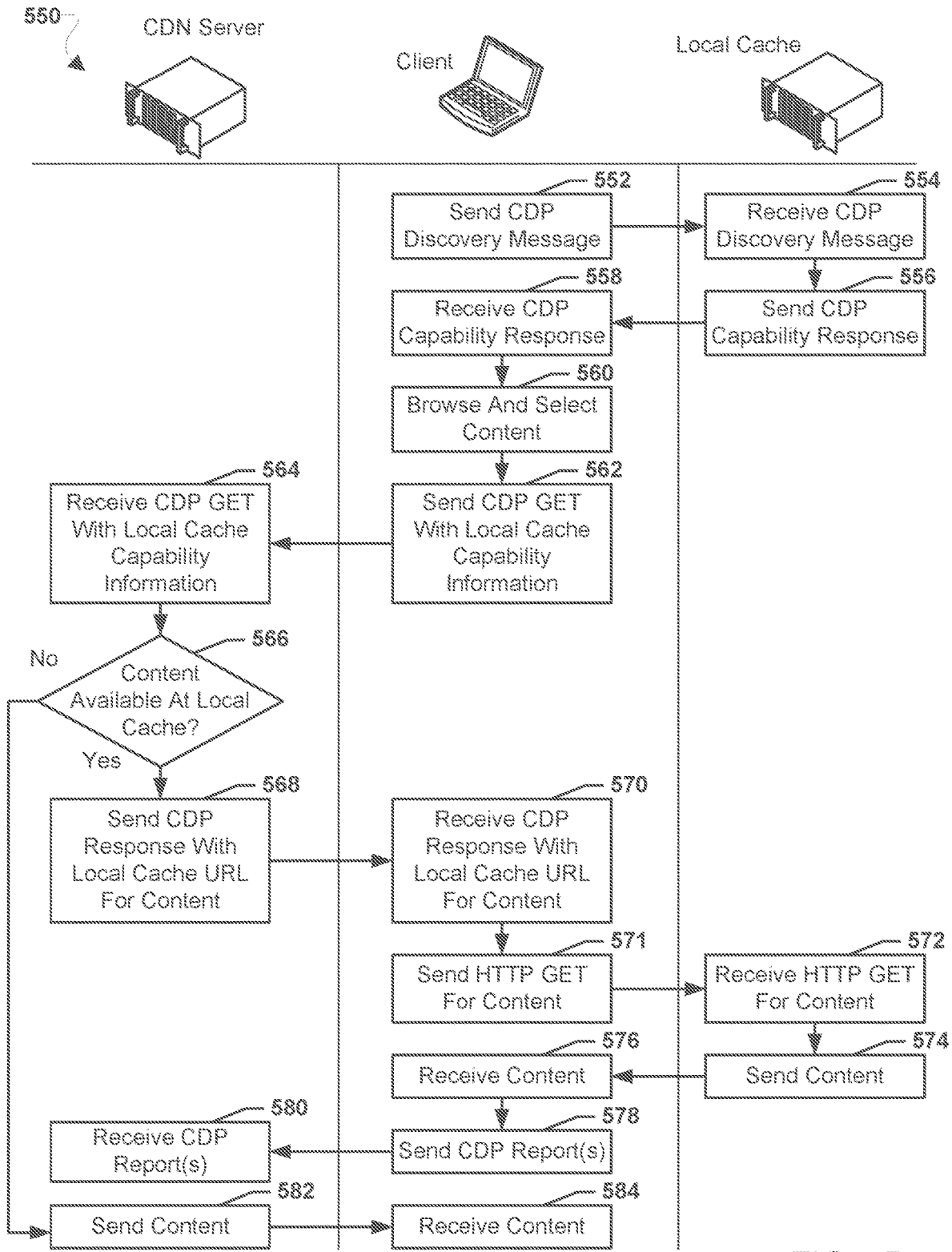
FIG. 5B is a process flow diagram illustrating an embodiment method for content delivery.

FIG. 5B illustrates an embodiment method 550 for content delivery. In various embodiments, the operations of method 550 may be performed by a processor of a CDN server, such as servers 110, 120, 121, 122, and 123, processors of tier cache servers, such as tier cache servers 302, 304, and 306, and a processor of a computing device, such as computing device 103, 104, and 107. In various embodiments, the operations of method 550 may be performed in conjunction with one or more operations illustrated in FIG. 5A.

With reference to FIGS. 1-5B, in block 552 the client computing device may send a CDP discovery message to a local cache server and in block 554 the local cache server may receive the CDP discovery message. A CDP discovery message may be an anycast discovery request indicating to a receiving network node (e.g., a tier cache server) to provide topology data in response to the CDP discovery message. In some embodiments, local cache servers may be configured to listen for and respond to CDP discovery messages.

In block 556 the local cache server may send a CDP capability response to the client computing device and in block 558 the client computing device may receive the CDP capability response. The CDP capability response may include topology data of the local cache server, such as one or more address (e.g., IPv4, IPv6, etc.), capability information, assigned tier level, redundant tier cache server address, etc. Based on receiving the capability response from the local cache server, the client computing device may determine the path from the client computing device through the reachable tier cache servers of the various tiers in its respective ISP network.

In block 560 the client computing device may browse and select content. The client computing device may select an item of content by browsing a website, receiving a catalog file with content information, or in any other manner. As one example, the client computing device may browse a web page hosted by the CDN server (or another server associated with the CDN) listing content available for downloading. In various embodiments, the web page data, such as field elements of the web page, may indicate whether or not the CDN server supports CDP requests.

In block 562 the client computing device may send a CDP GET with local cache capability information to the CDN server and in block 564 the CDN server may receive the CDP GET with local cache capability information. The local cache capability information about the local cache server, such as the various supported versions, docker or virtual machine requirements at the local cache server, etc. For example, an example schema may be as follows for a CDP GET indicating capability information for the local cache server:

```
GET controller.example.com/video.file
{
    "current version" : [ "1.9.35" ]
    "fallback version" : ["1.7LTR, 1.0"]
  }
}
{
"version" : [ "1.9.35"]
T2-Cache-IPv4: 10.10.10.25 10.10.10.26
T2-Cache-IPv6: 2001:db8::10:25/128
T3-Cache-IPv4: 10.11.11.25 10.11.11.26
}
{
"version" : [ "1.0"]
T2-Cache-IPv4: 10.10.10.25 10.10.10.26
T3-Cache-IPv4: 10.11.11.25 10.11.11.26
}
As another example, an example schema may be as follows for a CDP GET indicating
different capabilities of the local cache server for live video streaming in one version
"1.9.36" while not in another version "1.9.35":
GET controller.example.com/livevideo.feed
{
    "current version" : [ "1.9.36" ]
    "fallback version" : ["1.9.35, 1.7LTR, 1.0"]
  }
}
{
"version" : [ "1.9.36"]
T2-Cache-IPv4: 10.10.10.25 10.10.10.26
T2-Cache-IPv6: 2001:db8::10:25/128
T3-Cache-IPv4: 10.11.11.25 10.11.11.26
T1-Live-Video-Server-v4: "10.10.10.25 {
Live-Method: Unicast-Fed-Multicast
}
}
```

```
{
"version" : [ "1.9.35"]
T2-Cache-IPv4: 10.10.10.25 10.10.10.26
T2-Cache-IPv6: 2001:db8::10:25/128
T3-Cache-IPv4: 10.11.11.25 10.11.11.26
}
```
As another example, an example schema may be as follows for a CDP GET indicating different capabilities of the local cache server for live video streaming in one version "1.9.36" while not in another version "1.9.35:
GET controller.example.com/video.file
```
{
    "current version" : [ "1.9.37" ]
    "fallback version" : ["1.9.34, 1.7LTR, 1.0"]
    }
}
{
"version" : [ "1.9.37"]
T2-Cache-IPv4: 10.10.10.25 10.10.10.26
T2-Cache-IPv6: 2001:db8::10:25/128
T3-Cache-IPv4: 10.11.11.25 10.11.11.26
T1-Live-Video-Server-v4: "10.10.10.25 {
Live-Method: Unicast-Fed-Multicast
}
Docker-container-support-IPv6: {
    "t2" : {
    "2001:1998:0:111:111::/64"
}
{
"version" : [ "1.9.34"]
T2-Cache-IPv4: 10.10.10.25 10.10.10.26
T3-Cache-IPv4: 10.11.11.25 10.11.11.26
}
```

In determination block 566 the CDN server may determine whether the content is available at the local cache. For example, the requested item of content may be available at the CDN server itself or the local cache based on the demand for the content. The CDN server may compare the tier 1 cache address listed in the CDP GET to a listing of where the requested content is stored to determine whether the content is available at the local cache. The tier 1 cache address being on the listing of where the requested content is stored may indicate the content is available at the local cache. The tier 1 cache address no being on the listing of where the requested content is stored may indicate the content is not available at the local cache.

In response to determining that the content is available at the local cache (i.e., determination block 566=("Yes"), the CDN server may send a CDP response with a local cache URL for the content in block 568 and the client computing device may receive the CDP response with the local cache URL for the content in block 570. The local cache URL may include a file name of the content that is a hash sum of the requested content.

In block 571 the client computing device may send a HTTP GET for the content to the local cache server and in block 572 the local cache server may receive the HTTP GET for the content. The HTTP GET may be directed to the URL received in the CDP response. In block 574 the local cache server may send the content to the client computing device and in block 576 the client computing device may receive the content. In response to receiving the content, the client computing device may generate a hash of the content. For example, the client may use the content as an input to the same hash function used by the CDN server to generate the file name, and compare the hash sum output to the file name that is the hash sum provided in the CDP response. In response to the hash sums matching, the client computing device may determine that the content is the correct content and/or that the content has not been altered. In response to the hash sums not matching, the client computing device may determine that the received content is not the correct content and/or that the content has been altered. In various embodiments, the client computing device may not output or otherwise use content that is not the correct content and/or that the content has been altered.

In block 578 the client computing device may send one or more CDP reports to the CDN server and in block 580 the CDN server may receive the one or more CDP reports. The CDP reports may be sent from the client computing device to the CDN server in response to attempting download of the content, during the downloading of content, and/or upon completion of the download of the content. The CDP reports may report on various attributes of the download of the content, such as transfer rate, error rate, latency, speed, data volume, throughput, bitrate, etc. As one example, the client computing device may send a CDP progress report to the CDN server indicating whether the request of the content from the local cache server was successful or not. For example, a cache miss at a tier cache server may result in a CDP progress report indicating the cache miss being sent to the CDN server. As another example, the client computing device may send a CDP progress report to the CDN server indicating attributes of the download of the content, such as transfer rate, error rate, latency, speed, data volume, throughput, bitrate, etc., from the local cache server. As a further example, when the download is complete, the client computing device may send a CDP completion report to the CDN server indicating attributes of the download of the content, such as transfer rate, error rate, latency, speed, data volume, throughput, bitrate, etc., from the local cache server. Additionally, the CDP completion report may indicate whether or not the check of the hash sum of the file name of the content was successful. One or more of the various CDP reports may be sent for each download. For example, multiple CDP progress reports and a CDP completion report may be sent for each download.

In response to determining that the content is not available at a local cache (i.e., determination block 566="No"), in block 582 the CDN server may send the content to the client computing device and in block 584 the client computing device may receive the content.

Figure 6:
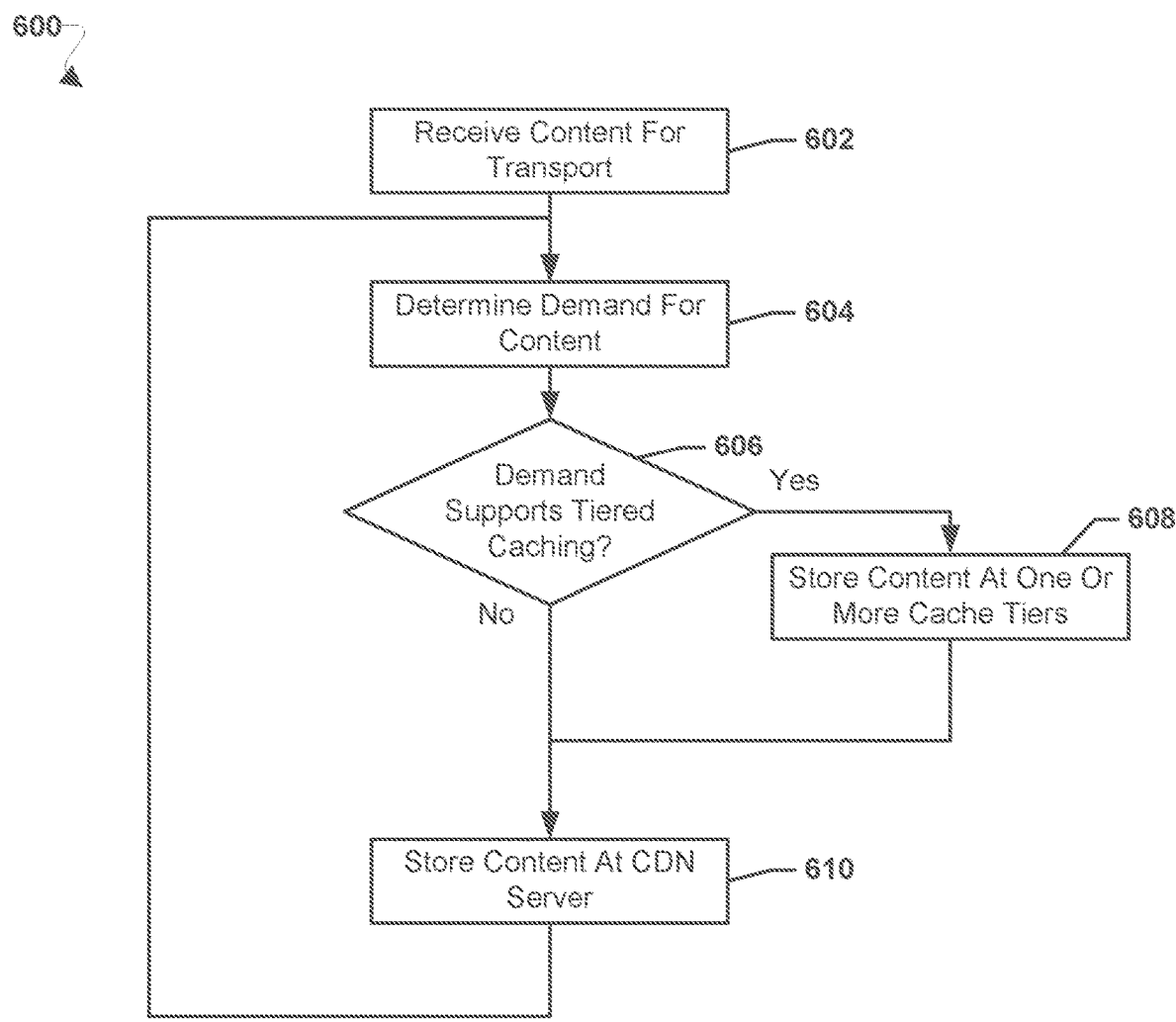
FIG. 6 is a process flow diagram illustrating an embodiment method for tiered caching of content.

FIG. 6 illustrates an embodiment method 600 for tiered caching of content. In various embodiments, the operations of method 600 may be performed by a processor of a CDN server, such servers 110, 120, 121, 122, and 123, In various embodiments, the operations of method 600 may be performed in conjunction with operations of method 550 of FIG. 5B and/or one or more operations illustrated in FIG. 5A.

With reference to FIGS. 1-6, in block 602 the CDN server may receive content for transport. The content may be data for download by client computing devices. In block 604 the CDN server may determine demand for the content. Demand for the content may be based on historical information related to the content and/or similar types of content, based on usage reporting for the content, such as CDP reports, based on attributes of the content, based on predicted usage information related to the content and/or similar types of content, and/or based on any other information associated with the content.

In determination block 606 the CDN server may determine whether the demand supports tiered caching. For example, a demand threshold may set a minimum limit above which content much reach to qualify to be tier cached. Content with demand at or below the demand threshold may not be tier cached and content with demand above the demand threshold may be tier cached.

In response to determining that the demand supports tiered caching (i.e., determination block 606="Yes"), in block 608 the CDN server may store the content at one or more cache tiers. For example, based at least in part on the demand, the content may be pushed to tiers closer to the network edge, such as with the highest demand content pushed through all tiers down to tier 1 tier cache servers and the lower demand content pushed to tier 2 and/or tier 3 cache servers, with the highest predicted usage content pushed through all tiers down to tier 1 tier cache server and the lower demand content pushed to tier 2 and/or tier 3 cache server, of in any other manner based on the demand and/or other considerations.

In response to storing the content at one or more cache tiers or in response to determining that the demand does not support tiered caching (i.e., determination block 606="No"), in block 610 the CDN server may store the content at the CDN server. The method 600 may proceed to block 604 to determine the demand for the content. In this manner, the demand may be continually determined and storage at the cache tiers may be updated as demand increases.

Figure 7:
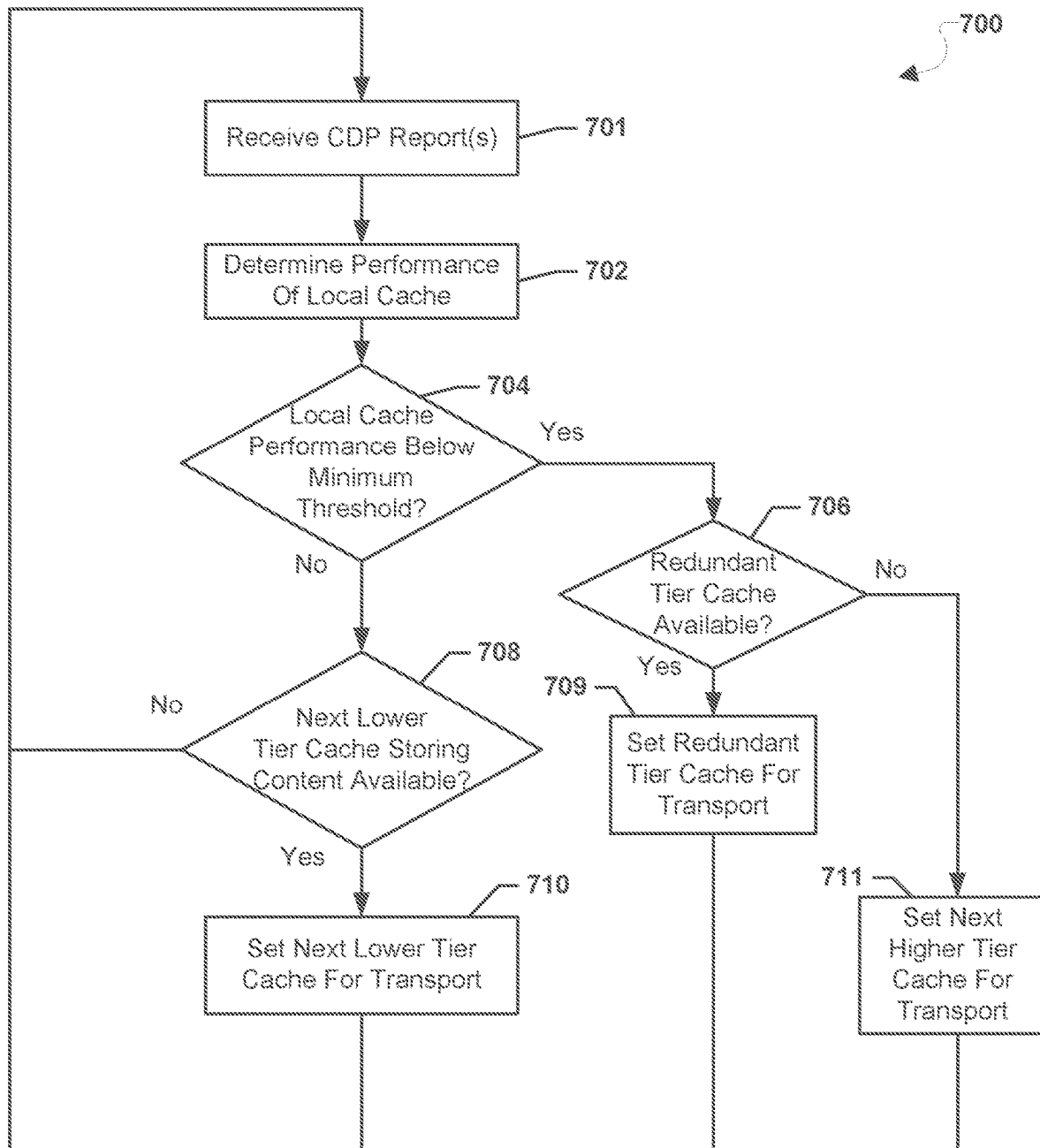
FIG. 7 is a process flow diagram illustrating an embodiment method for determining a local cache for content.

FIG. 7 is a process flow diagram illustrating an embodiment method for determining a local cache for content. In various embodiments, the operations of method 700 may be performed by a processor of a CDN server, such servers 110, 120, 121, 122, and 123, In various embodiments, the operations of method 700 may be performed in conjunction with operations of methods 550 and/or 600 of FIGS. 5B and 6 and/or one or more operations illustrated in FIG. 5A.

With reference to FIGS. 1-7, in block 701 the CDN server may receive CDP reports. The CDP reports may be sent from the client computing device to the CDN server in response to attempting download of the content, during the downloading of content, and/or upon completion of the download of the content. The CDP reports may report on various attributes of the download of the content, such as transfer rate, error rate, latency, speed, data volume, throughput, bitrate, etc. As one example, the client computing device may send a CDP progress report to the CDN server indicating whether the request of the content from the local cache server was successful or not. For example, a cache miss at a tier cache server may result in a CDP progress report indicating the cache miss being sent to the CDN server. As another example, the client computing device may send a CDP progress report to the CDN server indicating attributes of the download of the content, such as transfer rate, error rate, latency, speed, data volume, throughput, bitrate, etc., from the local cache server. As a further example, when the download is complete, the client computing device may send a CDP completion report to the CDN server indicating attributes of the download of the content, such as transfer rate, error rate, latency, speed, data volume, throughput, bitrate, etc., from the local cache server. Additionally, the CDP completion report may indicate whether or not the check of the hash sum of the file name of the content was successful. One or more of the various CDP reports may be sent for each download. For example, multiple CDP progress reports and a CDP completion report may be sent for each download.

In block 702 the CDN server may determine performance of the local cache. Performance of the local cache may be determined based at least in part on transfer rate, error rate, latency, speed, data volume, throughput, bitrate, etc. In determination block 704 the CDN server may determine whether the local cache performance is below a minimum threshold.

In response to determining that the local cache performance is below the minimum threshold (i.e., determination block 704="Yes"), in determination block 706 the CDN server may determine whether there is a redundant tier cache available. A redundant tier cache may be a tier cache in the same tier level and in the same ISP network that may be an alternative to the current local cache for client computing devices in that ISP network. In response to determining a redundant tier cache is available (i.e., determination block 706="Yes"), in block 709 the CDN server may set the redundant tier cache for transport. The redundant tier cache may be set for transport by the CDN server updating a table or listing of tier cache servers to reflect that one or more items of content are to be served from the redundant tier cache when a request for that content is received at the CDN server.

In response to determining a redundant tier cache is not available (i.e., determination block 706="Yes"), in block 710 the CDN server may set the next higher tier cache for transport. For example, when a tier 1 local cache is not available, a tier 2 cache may be set for transport. The next higher tier cache may be set for transport by the CDN server updating a table or listing of tier cache servers to reflect that one or more items of content are to be served from the next higher tier cache when a request for that content is received at the CDN server.

In response to determining that the local cache performance is at or above the minimum threshold (i.e., determination block 704="No"), in determination block 708 the CDN server may determine whether the next lower tier cache storing the content is available. The next lower tier cache storing the content may be a tier cache closer to the ISP network edge than the currently set tier cache for transport. For example, when a tier 2 cache is set for transport, the CDN server may determine if a tier 1 cache is available. In response to determining that the next lower tier cache is available (i.e., determination block 708="Yes"), in block 710 the CDN server may set the next lower tier cache for transport. The next lower tier cache may be set for transport by the CDN server updating a table or listing of tier cache servers to reflect that one or more items of content are to be served from the next lower tier cache when a request for that content is received at the CDN server.

In response to setting a tier cache for transport in blocks 709, 710, or 711 or in response to determining that the next lower tier cache is not available (i.e., determination block 708="No"), the method 700 may return to block 701. In this manner, as local cache performance may change the tier caches set for transport may change as well.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 550, 600, and 700 may be substituted for or combined with one or more operations of the methods 550, 600, and 700 and vice versa.

Figure 8:
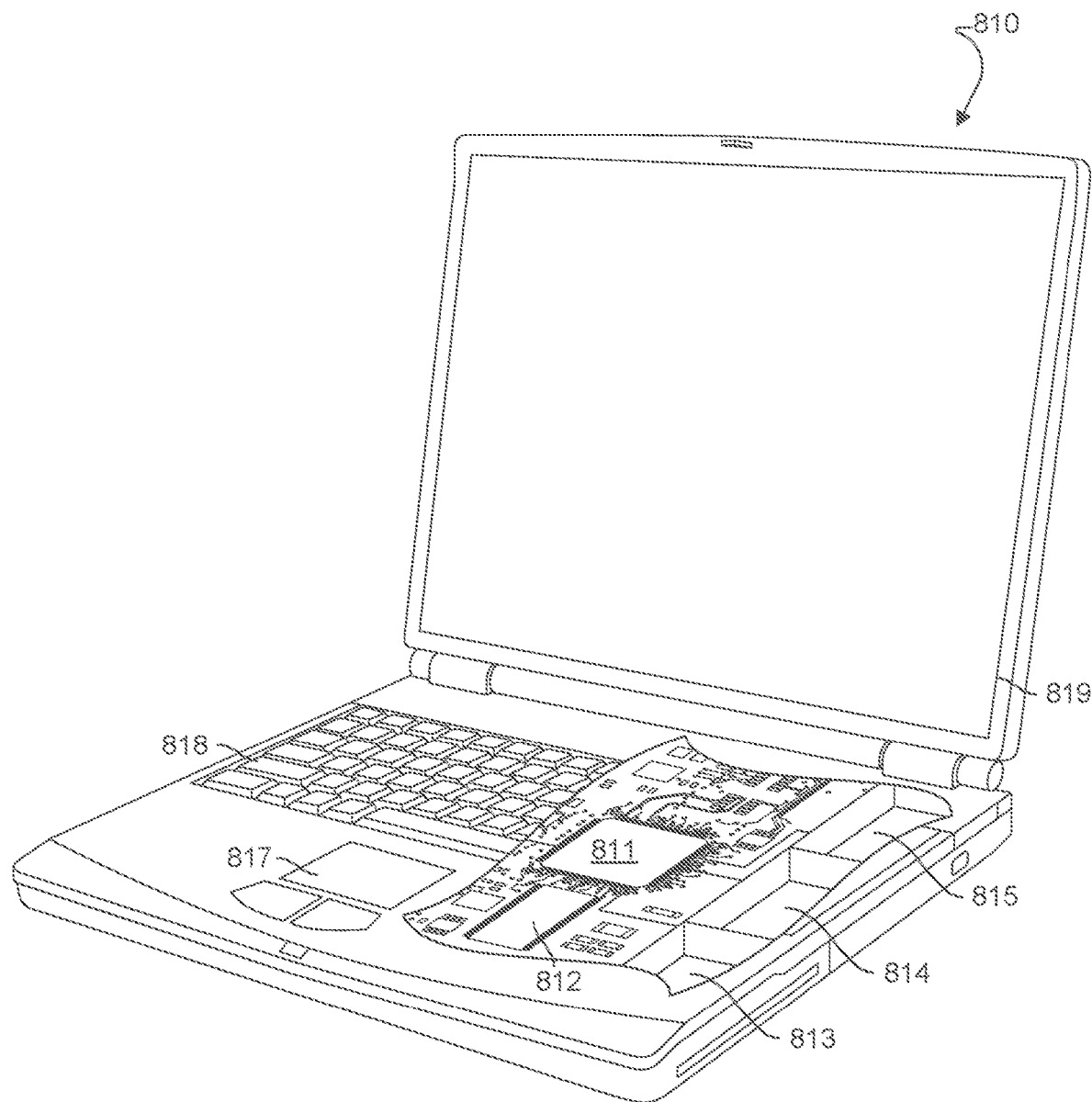
FIG. 8 is a component diagram of an example computing device suitable for use with various embodiments.

The various embodiments (including, but not limited to, embodiments discussed above with reference to FIGS. 1-7) described above may also be implemented within a variety of computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 812 and a large capacity non-volatile memory, such as a disk drive 813 of Flash memory. The laptop computer 810 may also include a floppy disc drive 814 and a compact disc (CD) drive 815 coupled to the processor 811. The laptop computer 810 may also include a number of connector ports coupled to the processor 811 for establishing data connections or receiving external memory devices, such as a USB or FireWire® connector sockets, or other network connection circuits (e.g., interfaces) for coupling the processor 811 to a network. In a notebook configuration, the computer housing may include the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various embodiments.

Figure 9:
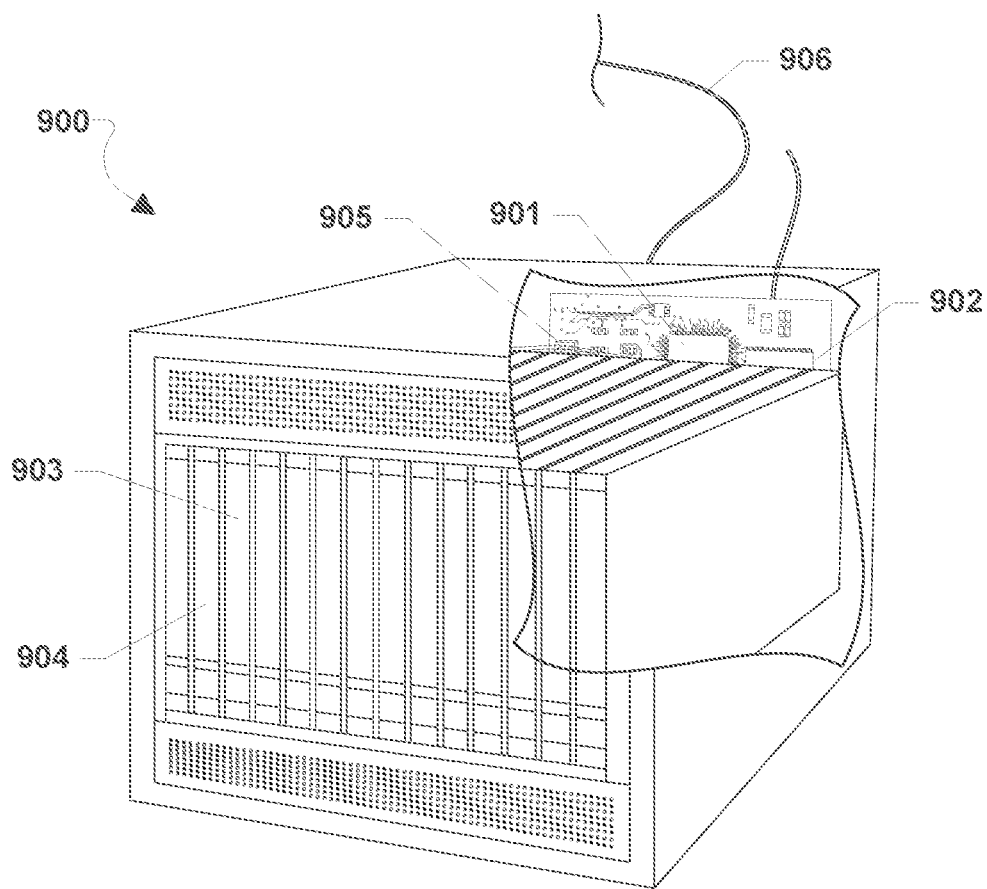
FIG. 9 is a component diagram of an example server suitable for use with the various embodiments.

Various embodiments (including, but not limited to, embodiments discussed above with reference to FIGS. 1-7) may be implemented on any of a variety of commercially available server devices, such as the server device 900 illustrated in FIG. 9. Such a server device 900 may include a processor 901 coupled to volatile memory 902 and a large capacity nonvolatile memory, such as a disk drive 903. The server device 900 may also include a floppy disc drive, compact disc (CD) or DVD disc drive 904 coupled to the processor 901. The server device 900 may also include network access ports 906 coupled to the processor 901 for establishing data connections with a network connection circuit 905 and a communication network (e.g., IP network) coupled to other communication system network elements.

The processors 811, 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 811, 901. The processors 811, 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 811, 901 including internal memory or removable memory plugged into the device and memory within the processors 811, 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for content delivery from a content delivery network (CDN), comprising:
    sending, from a processor of a computing device, a discovery message to an Internet Service Provider (ISP) network;
    receiving, at the processor of the computing device, a capability response from a local cache server in response to sending the discovery message, wherein the capability response indicates topology data for the local cache;
    sending, from the processor of the computing device, a request for content to the CDN including the topology data for the local cache server;
    receiving, at the processor of the computing device, a response from the CDN including an address for the content at the local cache server in response to sending the request for the content to the CDN;
    sending, from the processor of the computing device, a request for the content to the address for the content at the local cache server;
    receiving, at the processor of the computing device, the content from the local cache server in response to the request for the content to the address for the content at the local cache server; and
    sending, from the processor of the computing device, a report to the CDN in response to receiving the content from the local cache server,
    wherein:
        the discovery message is a content delivery protocol (CDP) discovery message;
        the capability response is a CDP capability response;
        the request for content to the CDN is a CDP GET message; and
        the request for the content to the address for the content at the local cache server is an Hypertext Transfer Protocol (HTTP) GET message.

2. The method of claim 1, further comprising:
    receiving, at the processor of the computing device, a response from the CDN including an address for the content at the local cache server in response to sending the request for the content to the CDN; and
    sending, from the processor of the computing device, a request for the content to the address for the content at the local cache server.

3. The method of claim 1, wherein receiving the capability response from the local cache server comprises receiving a capability response that indicates topology data that indicates one or more of tier cache server capability information, tier cache server assigned tier level, or redundant tier cache server addresses.

4. The method of claim 3, wherein the tier cache server capability information includes at least one or more of a supported version information, docker information or virtual machine information.

5. The method of claim 1, wherein the topology data for the local cache server indicates tier cache server addresses in the ISP network.

6. The method of claim 5, wherein the topology data is signed by a key of the CDN.

7. The method of claim 6, wherein the response from the address for the content at the local cache server includes a file name for the content that is a hash sum of the content.

8. The method of claim 5, wherein the topology data indicates three different tier cache server addresses and the three different tier cache server address are at different levels of the ISP network.

9. A device, comprising:
    a processor configured with processor-executable instructions to:
        send a discovery message to an Internet Service Provider (ISP) network;
        receive a capability response from a local cache server in response to sending the discovery message, wherein the capability response indicates topology data for the local cache;
        send a request for content to a content delivery network (CDN) including the topology data for the local cache server;
        receive a response from the CDN including an address for the content at the local cache server in response to sending the request for the content to the CDN;
        send a request for the content to the address for the content at the local cache server;
        receive the content from the local cache server in response to the request for the content to the address for the content at the local cache server; and
        send a report to the CDN in response to receiving the content from the local cache server,
    wherein:
        the discovery message is a content delivery protocol (CDP) discovery message;
        the capability response is a CDP capability response;
        the request for content to the CDN is a CDP GET message; and the request for the content to the address for the content at the local cache server is an Hypertext Transfer Protocol (HTTP) GET message.

10. The device of claim 9, wherein the processor is further configured to:
receive a response from the CDN including an address for the content at the local cache server in response to sending the request for the content to the CDN; and
send a request for the content to the address for the content at the local cache server.

11. The device of claim 9, wherein the processor is configured to receive the capability response from the local cache server by receiving a capability response that indicates topology data that indicates one or more of tier cache server capability information, tier cache server assigned tier level, or redundant tier cache server addresses.

12. The device of claim 11, wherein the tier cache server capability information includes at least one or more of a supported version information, docker information or virtual machine information.

13. The device of claim 9, wherein the topology data for the local cache server indicates tier cache server addresses in the ISP network.

14. The device of claim 13, wherein the topology data is signed by a key of the CDN.

15. The device of claim 14, wherein the response from the address for the content at the local cache server includes a file name for the content that is a hash sum of the content.

16. The device of claim 13, wherein the topology data indicates three different tier cache server addresses and the three different tier cache server address are at different levels of the ISP network.

17. A non-transitory processor-readable storage medium having stored thereon processor-executable instructions configured to cause a processor to perform operations for content delivery from a content delivery network (CDN), the operations comprising:
sending a discovery message to an Internet Service Provider (ISP) network;
receiving a capability response from a local cache server in response to sending the discovery message, wherein the capability response indicates topology data for the local cache;
sending a request for content to the CDN including the topology data for the local cache server;
receiving a response from the CDN including an address for the content at the local cache server in response to sending the request for the content to the CDN;
sending a request for the content to the address for the content at the local cache server;
receiving the content from the local cache server in response to the request for the content to the address for the content at the local cache server; and
sending a report to the CDN in response to receiving the content from the local cache server,
wherein:
the discovery message is a content delivery protocol (CDP) discovery message;
the capability response is a CDP capability response;
the request for content to the CDN is a CDP GET message; and
the request for the content to the address for the content at the local cache server is an Hypertext Transfer Protocol (HTTP) GET message.

18. The non-transitory processor-readable storage medium of claim 17, wherein the stored processor-executable instructions are configured to cause a processor to perform operations further comprising:
receiving a response from the CDN including an address for the content at the local cache server in response to sending the request for the content to the CDN; and
sending a request for the content to the address for the content at the local cache server.

19. The non-transitory processor-readable storage medium of claim 17, wherein the stored processor-executable instructions are configured to cause a processor to perform operations such that receiving the capability response from the local cache server comprises receiving a capability response that indicates topology data that indicates one or more of tier cache server capability information, tier cache server assigned tier level, or redundant tier cache server addresses.

20. The non-transitory processor-readable storage medium of claim 19, wherein the tier cache server capability information includes at least one or more of a supported version information, docker information or virtual machine information.

21. The non-transitory processor-readable storage medium of claim 17, wherein the topology data for the local cache server indicates tier cache server addresses in the ISP network.

22. The non-transitory processor-readable storage medium of claim 21, wherein the topology data is signed by a key of the CDN.

23. The non-transitory processor-readable storage medium of claim 22, wherein the response from the address for the content at the local cache server includes a file name for the content that is a hash sum of the content.

24. The non-transitory processor-readable storage medium of claim 21, wherein the topology data indicates three different tier cache server addresses and the three different tier cache server address are at different levels of the ISP network.

* * * * *